Aug. 23, 1938. R. GIRARD 2,127,864
CONTROL DEVICE FOR THE FLAPS OF AIRCRAFT
Filed Jan. 30, 1937 2 Sheets-Sheet 1
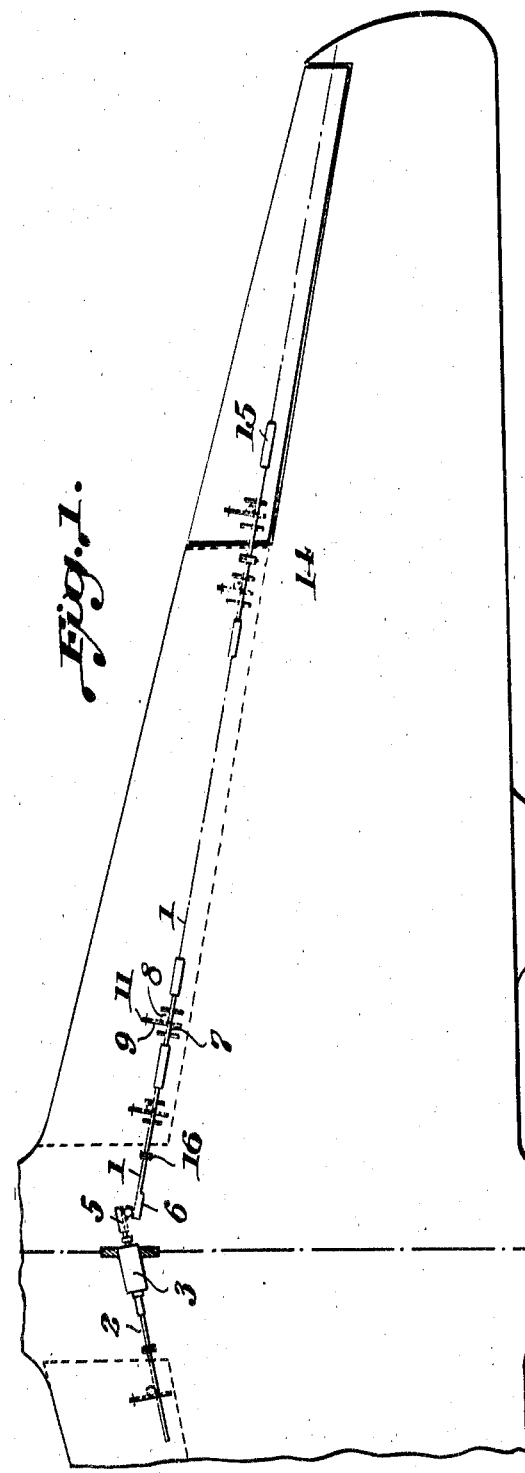
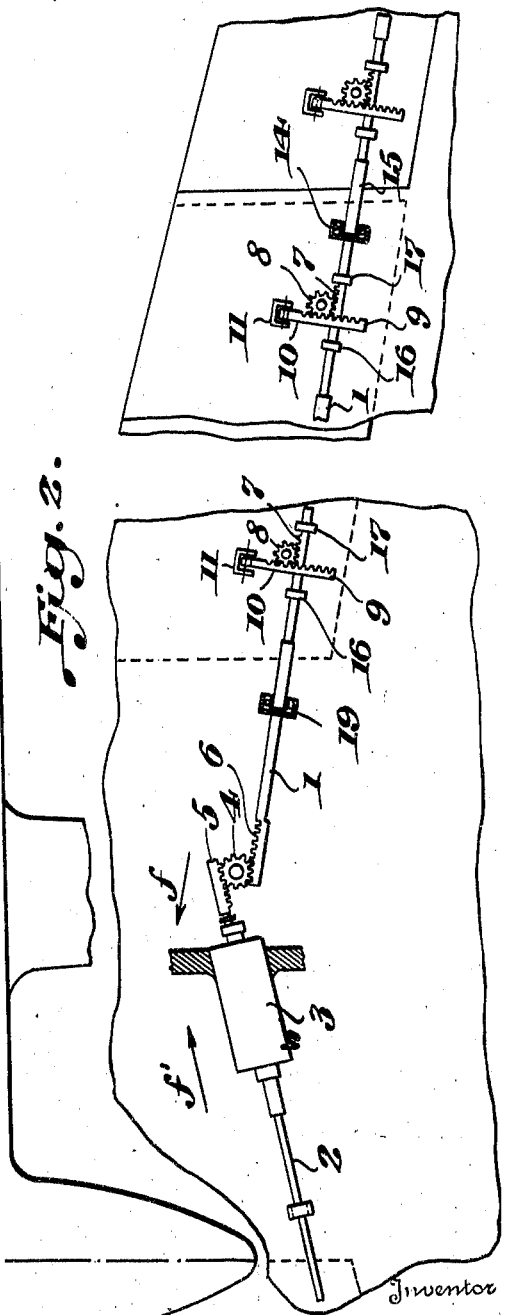
Inventor
RENE GIRARD
By Young, Emery & Thompson
Attorneys

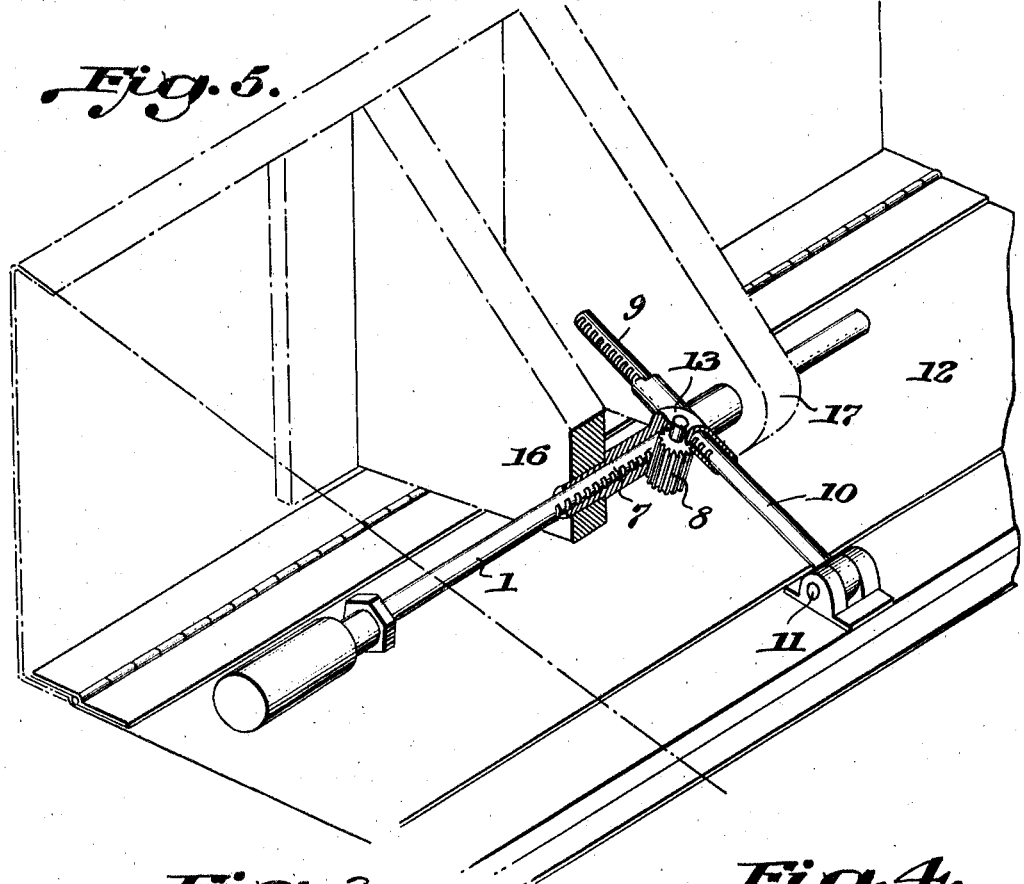
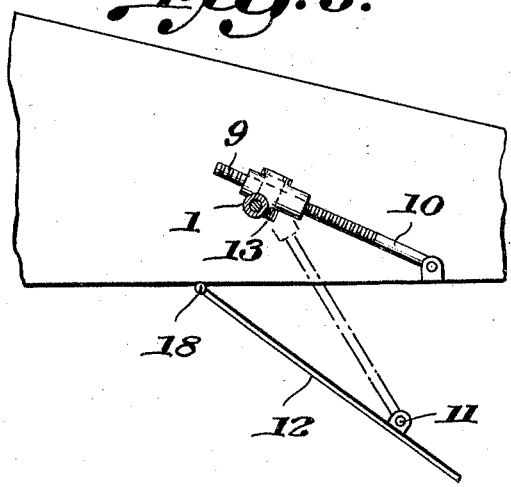
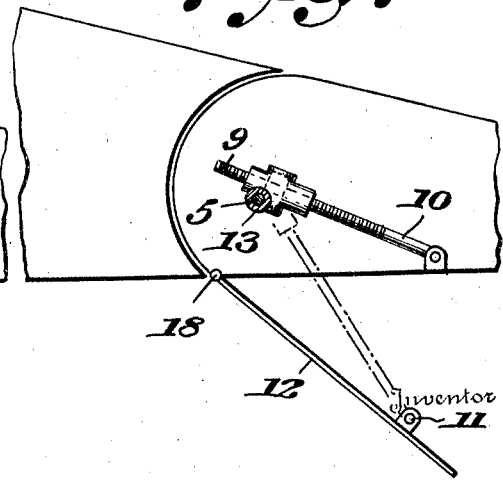

Patented Aug. 23, 1938

2,127,864

UNITED STATES PATENT OFFICE 2,127,864

CONTROL DEVICE FOR THE FLAPS OF AIRCRAFT

René Girard, Bourges, France, assignor to Compagnie des Avions Hanriot, Paris, France, a corporation of France Application January 30, 1937, Serial No. 123,288
In France February 25, 1936

2 Claims. (Cl. 244—83)

My invention has for its object a control device for the flaps of aircraft, in particular the type of split flaps which extend over the whole or portion of the span, said device being adapted to ensure, without increase in weight, a sure operation of these flaps.

This device is formed by a rod extending over the whole of the portion of the span occupied by the flaps, actuated by a control rod which imparts a longitudinal movement thereto, and provided with members for transmitting the movements in the direction of the chord of the wing, the said members actuating the split flaps in a suitable manner. Each of the transmission members is formed by a bar hinged to the split flaps and a portion of which is cut in the form of a rack gearing with a pinion which also gears with a portion of the rod cut as a rack.

According to another feature of the invention the assembly constituted by the rod and the transmission members is arranged for rotation about the axis of the rod. For this purpose the rod may comprise a plurality of aligned sections connected together by thrust members, for example ball thrust bearings, and capable of carrying out independent rotary movements.

Such a device has the advantage of considerable simplicity and lightness, qualities which are of considerable importance in the aircraft construction. It also has the advantage of providing a single control for all the flaps with a minimum clearance. The control rod extending over the entire span of the wing and preferably actuated in the direction of tension, actuates the successive members of transmission without breaking continuity. The only clearances which may occur are those of the members of transmission. This only occurs in parallel in the whole of the control and the separate amounts of movement are not additive to one another. The elastic clearance is also reduced to a minimum, no control element being subjected to bending or torsion forces.

According to yet another feature of the invention, the device described above may be applied to the simultaneous control of simple split flaps and compound flaps, wherein the split flap is hinged to the aileron. In this case the actuating rod constitutes the axis of rotation of the aileron. This arrangement enables the upper flap (aileron) to be operated without movement relatively to the lower flap, the angle of the latter with the aileron remaining constant.

My invention will be illustrated in the accompanying drawings which show one embodiment wherein:

Fig. 1 is a view of the whole of the control device on an aircraft wing.

Fig. 2 is a partial view to a larger scale of the various parts of the control.

Figs. 3 and 4 are sections of the wing respectively on the lines A—A, B—B of Fig. 2, and Fig. 5 is a detail view of the member for transmitting the controlling movement.

On the portion of the span of each wing provided with flaps, is located a straight rod 1 (or 2). The rod 2 is connected directly to a hydraulic-jack 3 which transmits its force simultaneously to the rod 1 by means of a pinion 4 and two racks 5 and 6. The jack 3 serves as a single actuating member for the two rods 1 and 2 acting in the direction of tension of these rods (along the arrows f—f', Fig. 2).

On the rod 1 (the arrangement is identical for the rod 2), members for the transmission of the movement are provided from place to place according to Fig. 5.

These members consist of a rack 7, provided on the actuating rod 1, which meshes with a pinion 8. The pinion 8 in turn meshes with a rack 9 provided on a rod 10 hinged at 11 to the flap 12 to be actuated. The assembly of racks 7, 9 and pinion 8 is mounted in a casing 13.

It will be seen that when the jack 3 pulls the rod 1 in the direction of the arrow f, the movement of this rod 1 is transmitted by the racks 7 and 9 and the pinion 8 to the rod 10. This acts in the manner of a crank and actuates the flap 12, which moves away from the wing a distance in proportion, on the one hand, to the movement imparted by the jack 3, on the other hand, to the length of the rod 10.

In order to actuate a compound flap, the section 15 of the rod 1 is used as the axis of rotation of the upper aileron. This section 15 may carry out an independent rotation. For this purpose it is connected by a ball thrust bearing 14 to the rod 1.

The casing 13 is mounted on two bearings 16 and 17 secured to the wing.

With this arrangement when the upper flap is actuated (by an independent control), the lower flap hinged on the said aileron at 18, does not take up any relative movement, and in particular, the angle which it forms with the upper flap remains constant. The lower flap turns about the axis 18 only by the translation of the rod 1 by means of the jack 3 as described above.

A ball thrust bearing 16 (Fig. 2) is provided for connecting the rack 5 to the portion of the rod actuating the simple split flap. In this manner the successive sections of the rod 1 can carry out independent movements of rotation. The movement of translation of this rod is meanwhile transmitted to the whole of the rod and simultaneously actuates the simple split flap and the split flap of the combined aileron.

The device described by way of example may receive any desired modifications and adaptations.

What I claim is:

1. In an airplane wing having a split flap hinged on the wing and an aileron on which another split flap is hinged, means for simultaneously controlling all of said split flaps comprising a rectilinear rod extending throughout the entire spread of the wing and serving as the axis of rotation of the aileron, toothed racks carried by said rod, pinions meshing with said racks, and transversely extending bars connected to said split flaps at one end and provided with toothed racks at the other end meshing with said pinions.

2. In an airplane wing having a split flap hinged on the wing and an aileron on which another split flap is hinged, means for simultaneously controlling all of said split flaps comprising a rectilinear rod extending throughout the entire spread of the wing and formed of two aligned sections arranged end to end, one of said rod sections extending throughout the length of the flaps hinged directly to said wing, the other of said rod sections extending throughout the length of the aileron and serving as the axis of rotation of said aileron, means for coupling the abutting ends of said rod sections for transmitting tension from one rod section to the other but permitting relative rotation, toothed racks carried by said rod sections, pinions meshing with said racks, and transversely extending bars connected to said split flaps at one end and provided with toothed racks at the other end meshing with said pinions.

RENÉ GIRARD.